United States Patent
Abe et al.

(10) Patent No.: US 12,385,662 B2
(45) Date of Patent: Aug. 12, 2025

(54) AIR CONDITIONER

(71) Applicant: Mitsubishi Electric Corporation, Tokyo (JP)

(72) Inventors: Akihiro Abe, Tokyo (JP); Masafumi Tomita, Tokyo (JP); Tsutomu Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 195 days.

(21) Appl. No.: 18/251,028

(22) PCT Filed: Jan. 19, 2021

(86) PCT No.: PCT/JP2021/001682
§ 371 (c)(1),
(2) Date: Apr. 28, 2023

(87) PCT Pub. No.: WO2022/157832
PCT Pub. Date: Jul. 28, 2022

(65) Prior Publication Data
US 2023/0375211 A1   Nov. 23, 2023

(51) Int. Cl.
*F24F 11/72* (2018.01)
*F24F 1/38* (2011.01)
*F24F 11/63* (2018.01)

(52) U.S. Cl.
CPC ............... *F24F 11/72* (2018.01); *F24F 1/38* (2013.01); *F24F 11/63* (2018.01)

(58) Field of Classification Search
CPC .... F24F 11/72; F24F 1/38; F24F 11/63; F24F 1/08; F24F 11/77; F24F 11/871; F24F 2110/12
See application file for complete search history.

(56) References Cited

U.S. PATENT DOCUMENTS 4,284,128 A * 8/1981 Nelson ............... F24F 6/04
165/47
4,795,088 A * 1/1989 Kobayashi ........... F24F 11/64
62/298

(Continued)

FOREIGN PATENT DOCUMENTS

JP   H04-191167 A   7/1992
JP   2002-199787 A   7/2002

(Continued)

OTHER PUBLICATIONS

International Search Report of the International Searching Authority mailed Mar. 2, 2021 issued in corresponding International Application No. PCT/JP2021/001682 (and English translation).

*Primary Examiner* — Nelson J Nieves
(74) *Attorney, Agent, or Firm* — Posz Law Group, PLC (57) ABSTRACT

An air conditioner includes: an indoor unit; an outdoor unit; and a control unit that controls operation of the indoor unit and the outdoor unit. The outdoor unit includes: an outdoor unit fan that takes in air; an outside air temperature detection unit that detects an outside air temperature that is a temperature of outside air; and an air pressure acquisition unit that acquires an air pressure of outside air. The control unit calculates an air property value of air at an installation location of the air conditioner based on an outside air temperature acquired by the outside air temperature detection unit and an air pressure acquired by the air pressure acquisition unit, and controls the outdoor unit fan based on the air property value.

18 Claims, 8 Drawing Sheets

(56) References Cited

U.S. PATENT DOCUMENTS

| | | | | |
|---|---|---|---|---|
| 4,811,897 | A * | 3/1989 | Kobayashi | F24F 3/0442 |
| | | | | 236/51 |
| 5,722,483 | A * | 3/1998 | Gibson | F24F 12/006 |
| | | | | 454/251 |
| 10,182,550 | B2 * | 1/2019 | Schwarz | A01K 1/0052 |
| 10,610,907 | B1 * | 4/2020 | Scaringe | F24F 13/222 |
| 2018/0245814 | A1 * | 8/2018 | Yan | F24F 11/63 |
| 2018/0340701 | A1 * | 11/2018 | Baughman | F24F 11/77 |
| 2019/0086116 | A1 * | 3/2019 | Buchanan | F24F 11/74 |
| 2019/0331123 | A1 * | 10/2019 | Yang | F04D 27/004 |
| 2020/0240672 | A1 * | 7/2020 | Patil | F24F 11/77 |
| 2021/0041119 | A1 * | 2/2021 | Pham | F24F 3/14 |
| 2021/0236979 | A1 * | 8/2021 | Pham | B01D 46/444 |
| 2021/0396415 | A1 * | 12/2021 | Wirth | F24F 11/49 |
| 2023/0081655 | A1 * | 3/2023 | Aso | H02K 21/16 |
| | | | | 310/90 |

FOREIGN PATENT DOCUMENTS

| | | |
|---|---|---|
| JP | 2004-183607 A | 7/2004 |
| JP | 2016-145679 A | 8/2016 |
| WO | 2017/195374 A1 | 11/2017 |

\* cited by examiner

| PREFECTURE | MUNICIPALITY | ALTITUDE[m] |
|---|---|---|
| HOKKAIDO | WAKKANAI CITY | 96 |
| ⋮ | ⋮ | ⋮ |
| TOKYO METROPOLIS | CHIYODA WARD | 5 |
| ⋮ | ⋮ | ⋮ |
| NAGANO PREFECTURE | SUWA CITY | 761 |
| ⋮ | ⋮ | ⋮ |

AIR CONDITIONER

CROSS REFERENCE TO RELATED APPLICATION

This application is a U.S. national stage application of PCT/JP2021/001682 filed on Jan. 19, 2021, the contents of which are incorporated herein by reference.

FIELD

The present disclosure relates to an air conditioner that performs air conditioning.

BACKGROUND

Patent Literature 1 discloses a ventilator that controls exhaust air volume of an exhaust fan in accordance with air pressure and indoor temperature. In the ventilator described in Patent Literature 1, the density of air in a room is calculated from an air pressure detected by an air pressure sensor and an indoor temperature detected by an indoor temperature sensor, and the rotational speed of the exhaust fan is controlled according to a difference between a reference air density and the calculated density of air in the room. For example, when the density of air in the room is smaller than the reference air density, the air volume becomes small relative to the rotational speed of the exhaust fan. Therefore, correction control is performed in such a way as to increase the rotational speed of the exhaust fan, so that a desired air volume is achieved.

CITATION LIST

Patent Literature

Patent Literature 1: Japanese Patent Application Laid-open No. 2016-145679

SUMMARY

Technical Problem

Incidentally, conventional air conditioners do not take into consideration changes in an air property value due to air pressure and air temperature, and thus have a problem in that desired performance cannot be produced depending on installation environments. In one example, when a heat transfer coefficient regarding heat transfer between air and a heat exchanger of an outdoor unit decreases due to a change in an air property value, a necessary heat exchange amount cannot be achieved, so that desired performance cannot be produced. When desired performance cannot be produced, a room cannot be cooled during cooling, and the room cannot be warmed up during heating, causing user to feel uncomfortable. Therefore, even if the technique described in Patent Literature 1 is applied to an air conditioner, such a problem cannot be solved because the technique described in Patent Literature 1 relates to a ventilator.

The present disclosure has been made in view of the above, and an object of the present disclosure is to obtain an air conditioner capable of achieving a necessary heat exchange amount regardless of installation environments.

Solution to Problem

In order to solve the above-described problem and achieve the object, an air conditioner according to the present disclosure includes: an indoor unit; an outdoor unit; and a control unit that controls operation of the indoor unit and the outdoor unit. The outdoor unit includes: an outdoor unit fan that takes in air; an outside air temperature detection unit that detects an outside air temperature that is a temperature of outside air; and an air pressure acquisition unit that acquires an air pressure of outside air. The control unit calculates an air property value of air at an installation location of the air conditioner based on an outside air temperature acquired by the outside air temperature detection unit and an air pressure acquired by the air pressure acquisition unit, and controls the outdoor unit fan based on the air property value.

Advantageous Effects of Invention

The air conditioner according to the present disclosure has the effect of allowing a necessary heat exchange amount to be achieved regardless of installation environments.

DESCRIPTION OF EMBODIMENTS

Hereinafter, an air conditioner according to each embodiment of the present disclosure will be described in detail with reference to the drawings.

First Embodiment

Figure 1:
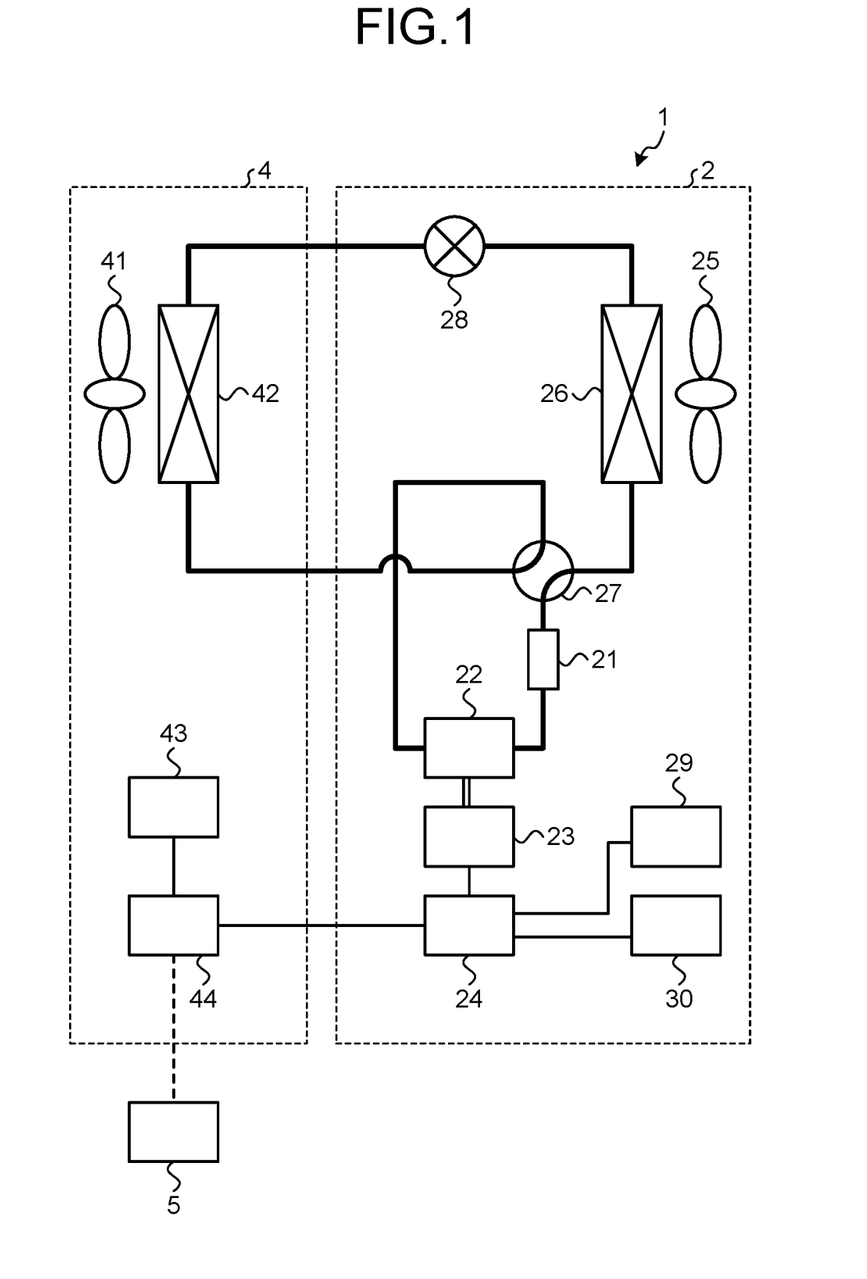
FIG. 1 is a diagram showing an example of a configuration of an air conditioner according to a first embodiment.

FIG. 1 is a diagram showing an example of a configuration of an air conditioner according to a first embodiment. An air conditioner 1 according to the first embodiment includes an outdoor unit 2, an indoor unit 4, and a remote 5. The indoor unit 4 is installed inside a room or the like, and the outdoor unit 2 is installed outside the room. Hereinafter, the remote controller 5 is referred to as the remote 5.

The outdoor unit 2 includes a refrigerant storage unit 21, a compressor 22, an electric motor drive device 23, and an outdoor unit control unit 24. The refrigerant storage unit 21 stores a refrigerant that circulates between the outdoor unit 2 and the indoor unit 4. The compressor 22 compresses the refrigerant. The electric motor drive device 23 drives the compressor 22. The outdoor unit control unit 24 controls the electric motor drive device 23. The outdoor unit 2 further includes an outdoor unit fan 25, an outdoor unit heat exchanger 26, a four-way valve 27, and a decompressor 28. The outdoor unit fan 25 takes in outdoor air. The outdoor unit heat exchanger 26 causes the outdoor air taken in by the outdoor unit fan 25 and the refrigerant to exchange heat. The four-way valve 27 switches flow paths of the refrigerant. The decompressor 28 decompresses the refrigerant. The decompressor 28 includes, for example, an electronic expansion valve. The outdoor unit 2 further includes an air pressure sensor 29 and an outside air temperature detection unit 30. The air pressure sensor 29 detects an air pressure at an installation location of the outdoor unit 2. The outside air temperature detection unit 30 detects a temperature of outside air at the installation location of the outdoor unit 2. The air pressure sensor 29 is an example of an air pressure acquisition unit. Hereinafter, the temperature at the installation location of the outdoor unit 2 is referred to as "outside air temperature". The compressor 22, the four-way valve 27, and the decompressor 28 correspond to actuators.

The indoor unit 4 includes an indoor unit fan 41, an indoor unit heat exchanger 42, and an indoor temperature detection unit 43. The indoor unit fan 41 takes in room air. The indoor unit heat exchanger 42 causes the air taken in by the indoor unit fan 41 and the refrigerant to exchange heat. The indoor temperature detection unit 43 detects a temperature of the room in which the indoor unit 4 is installed. The refrigerant circulates between the indoor unit 4 and the outdoor unit 2. For example, the indoor temperature detection unit 43 is disposed on a relatively upstream an air trunk for an airflow produced by the indoor unit fan 41. In a specific example, the indoor temperature detection unit 43 is desirably disposed such that the indoor unit heat exchanger 42 is located between the indoor temperature detection unit 43 and the indoor unit fan 41. With such an arrangement, the temperature of air to be conditioned can be accurately detected. Hereinafter, the temperature of the room where the indoor unit 4 is installed is referred to as an "indoor temperature". The indoor unit 4 further includes an indoor unit control unit 44 that controls constituent elements of the air conditioner 1.

The outdoor unit control unit 24 and the indoor unit control unit 44 correspond to a control unit that controls operation of the outdoor unit 2 and the indoor unit 4. In one example, the indoor unit control unit 44 includes a communication unit (not illustrated), and the outdoor unit control unit 24 includes a communication unit (not illustrated). The communication unit of the indoor unit control unit 44 and the communication unit of the outdoor unit control unit 24 are connected via a communication line.

The remote 5 instructs the indoor unit control unit 44 of the indoor unit 4 to make settings for air conditioning of the room in which the indoor unit 4 is installed, as specified by a user (not illustrated). The remote 5 is connected by wire or wirelessly connected to the indoor unit 4.

The indoor unit control unit 44 has a function of determining a heat exchange amount required in the air conditioner 1 on the basis of a user's instruction determined by the user operating the remote 5 and the indoor temperature detected by the indoor temperature detection unit 43. For example, the user's instruction includes a target temperature of the room where the indoor unit 4 is installed. The indoor unit control unit 44 determines control target values that are respective command values of the rotational speed of the compressor 22, operation of the four-way valve 27, the opening degree of the decompressor 28, the rotational speed of the outdoor unit fan 25, and the rotational speed of the indoor unit fan 41. The rotational speed is the number of rotations per unit time. The indoor unit control unit 44 transmits, to the outdoor unit control unit 24, the control target values for the rotational speed of the compressor 22, operation of the four-way valve 27, the opening degree of the decompressor 28, and the rotational speed of the outdoor unit fan 25 via the communication line.

The outdoor unit control unit 24 receives, via the communication line and the communication unit (not illustrated), the control target values for the rotational speed of the compressor 22, operation of the four-way valve 27, the opening degree of the decompressor 28, and the rotational speed of the outdoor unit fan 25, determined by the indoor unit control unit 44. The outdoor unit control unit 24 controls the compressor 22, the four-way valve 27, and the decompressor 28 based on the received control target values. Known control methods can be used to control the compressor 22, the four-way valve 27, and the decompressor 28.

In addition, the outdoor unit control unit 24 calculates an air property value at the installation location of the air conditioner 1, more specifically, at the installation location of the outdoor unit 2, based on an air pressure acquired from the air pressure sensor 29 and an outside air temperature acquired from the outside air temperature detection unit 30. The outdoor unit control unit 24 controls the outdoor unit fan 25 based on the calculated air property value. Specifically, the outdoor unit control unit 24 corrects the received control target value for the rotational speed of the outdoor unit fan 25 by using the calculated air property value, to obtain a corrected control target value, and controls the outdoor unit fan 25 by using the corrected control target value.

Figure 2:
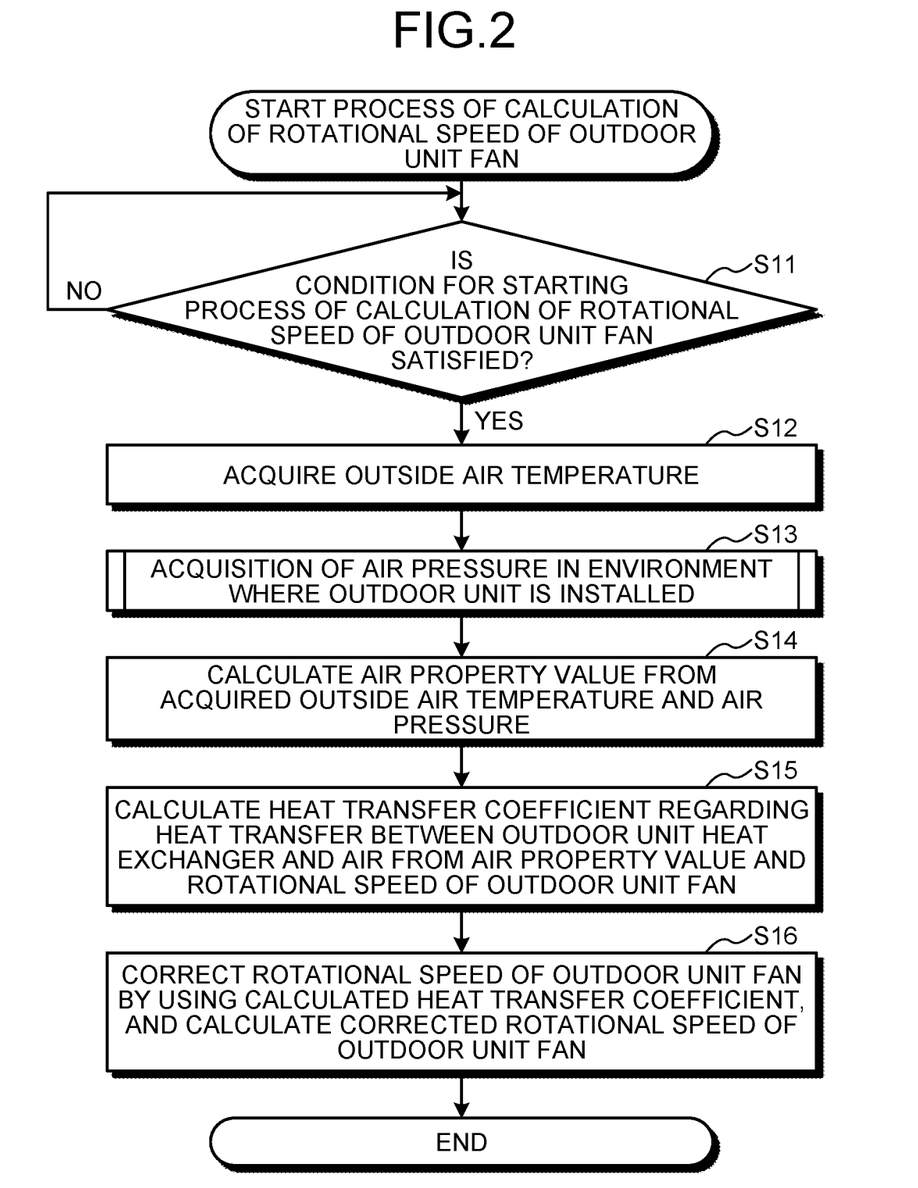
FIG. 2 is a flowchart showing an example of a procedure of calculation of the rotational speed of an outdoor unit fan in the air conditioner according to the first embodiment.

Hereinafter, a description will be given of a process of controlling the outdoor unit fan 25 including correction of the control target value for the rotational speed of the outdoor unit fan 25, to be performed by the outdoor unit control unit 24. FIG. 2 is a flowchart showing an example of a procedure of a process of calculation of the rotational speed of the outdoor unit fan in the air conditioner according to the first embodiment. Here, an example where the control target value for the rotational speed of the outdoor unit fan 25 is corrected by use of an air density as an air property value will be described.

First, the outdoor unit control unit 24 determines whether a condition for starting the process of calculation of the rotational speed of the outdoor unit fan 25 is satisfied (step S11). For the conditions to start the calculation, one example is that the control target value for the rotational speed of the outdoor unit fan 25 is received from the indoor unit control unit 44, one example is that it is detected that the outside air temperature acquired from the outside air temperature detection unit 30 or the air pressure acquired from the air pressure sensor 29 has changed by a certain threshold, and one example is that a predetermined period in a cyclic process starts. When the condition for starting the process of calculation of the rotational speed of the outdoor unit fan 25 is not satisfied (No in step S11), the outdoor unit control unit 24 is kept on standby.

When the condition for starting the calculation of the rotational speed of the outdoor unit fan 25 is satisfied (Yes in step S11), the outdoor unit control unit 24 acquires an outside air temperature from the outside air temperature detection unit 30 (step S12), and acquires, from the air pressure sensor 29, an air pressure in an environment where the outdoor unit 2 is installed (step S13).

Next, the outdoor unit control unit 24 calculates an air property value from the outside air temperature and air pressure acquired (step S14). Here, an example will be described in which an air density $\rho$ that is the air property value is calculated. Assuming that P[Pa] is the acquired air pressure, t[° C.] is the acquired outside air temperature, M[kg/kmol] is the average molecular weight of the air, and R[Nm/(kmol·K)] is a gas constant, the air density $\rho$[kg/m³] is expressed by equation (1) below. Note that this calculation assumes that M=28.9644[kg/kmol] and R=8.3143×10³[Nm/(kmol·K)].

Formula 1

$$\rho = \frac{M \times P}{R \times (t + 273.15)} - \frac{0.0034837 \times P}{t + 273.15} \qquad (1)$$

As shown in equation (1), the air density $\rho$ is an amount inversely proportional to the outside air temperature t and proportional to the air pressure P. The outdoor unit control unit 24 calculates the value of the air density $\rho$ by substituting, into equation (1), the outside air temperature t acquired in step S12 and the air pressure P acquired in step S13. The calculated value of the air density $\rho$ is used as an air property value.

Thereafter, the outdoor unit control unit 24 calculates a heat transfer coefficient regarding heat transfer between the outdoor unit heat exchanger 26 and the air, from the air property value and the rotational speed of the outdoor unit fan 25 (step S15). A known method is used to calculate the heat transfer coefficient. In one example, first, a Reynolds number Re and a Prandtl number Pr are obtained. The Reynolds number Re is an index indicating how likely fluid turbulence is to occur. The Prandtl number Pr represents a ratio of the kinematic viscosity coefficient to thermal diffusion coefficient of the fluid. Next, a Nusselt number Nu is calculated by use of the Reynolds number Re and the Prandtl number Pr. The Nusselt number Nu indicates how much heat transfer capability has been increased by convection with respect to stationary fluid. Then, a heat transfer coefficient h[W/(K/m²)] is obtained from known equation (2) below by use of the calculated Nusselt number Nu. Here, $\lambda$[W/(K/m)] is the thermal conductivity of air, and d[m] is a characteristic dimension. The characteristic dimension d is held in advance in the outdoor unit control unit 24, as a value that depends on the outdoor unit heat exchanger 26.

$$h = Nu \times \lambda / d \qquad (2)$$

Thereafter, the outdoor unit control unit 24 corrects the rotational speed of the outdoor unit fan 25 by using the calculated heat transfer coefficient, and calculates a corrected rotational speed of the outdoor unit fan 25 (step S16). The outdoor unit control unit 24 obtains, using equation (3) below, a ratio $K_h$ of a reference heat transfer coefficient $h_0$ that is a heat transfer coefficient serving as a reference value, to the heat transfer coefficient h in the installation environment of the outdoor unit 2 that is obtained in step S15. The reference heat transfer coefficient $h_0$ is a heat transfer coefficient obtained when the air property value is used in the indoor unit control unit 44 in obtaining the rotational speed of the outdoor unit fan 25, assuming that an air pressure $P_0$ is 101,325 Pa and an outside air temperature to is 25° C.

$$K_h = h_0 / h \qquad (3)$$

Equation (3) shows that the heat transfer coefficient regarding heat transfer between the outdoor unit heat exchanger 26 and the air needs to be multiplied by $K_h$ so as to achieve a desired heat exchange amount. In order to multiply the heat transfer coefficient by $K_h$, the Nusselt number Nu just needs to be multiplied by $K_h$ according to equation (2). In addition, a correction coefficient $K_u$ of a velocity u of air is obtained by equation (4) below from known Colburn's equation indicating a relationship between the Nusselt number Nu and the Reynolds number Re and a known relationship between the Reynolds number Re and the velocity u of air.

$$K_u = (K_h)^{5/4} \qquad (4)$$

It is known that the velocity u of air and the rotational speed of the outdoor unit fan 25 are proportional. Therefore, $K_u$ is a correction coefficient for the rotational speed of the outdoor unit fan 25 for multiplying the heat transfer coefficient by $K_h$, as expressed by equation (4). That is, the outdoor unit control unit 24 calculates the corrected rotational speed of the outdoor unit fan 25 by multiplying the rotational speed of the outdoor unit fan 25 received from the indoor unit control unit 44 by $K_u$. As a result, calculation of the rotational speed of the outdoor unit fan 25 ends. Note that, thereafter, the outdoor unit control unit 24 controls the rotational speed of the outdoor unit fan 25 by using the corrected rotational speed of the outdoor unit fan 25.

Note that the case where the air density $\rho$ is used as the air property value has been described above, but the air property value is not limited thereto, and other air property values such as a viscosity coefficient $\mu$ of air and the thermal conductivity A of air may be used. Even when these air property values are used, the air property values may be calculated by a known method by use of the outside air temperature and the air pressure.

Furthermore, in the above description, the rotational speed of the outdoor unit fan 25 obtained by the indoor unit control unit 44 is corrected by the outdoor unit control unit 24 on the basis of the air density. However, the rotational speed of the outdoor unit fan 25 may be corrected by another method. In one example, the outdoor unit control unit 24 may transmit the calculated air density to the indoor unit control unit 44 via the communication unit (not illustrated) such that the indoor unit control unit 44 calculates the rotational speed of the outdoor unit fan 25 on the basis of the received air density. Alternatively, in another example, the outdoor unit control unit 24 may transmit the acquired air pressure and outside air temperature to the indoor unit control unit 44 via the communication unit (not illustrated) such that the indoor unit control unit 44 calculates the air density of the installation environment of the outdoor unit 2, and calculates the rotational speed of the outdoor unit fan 25 on the basis of the calculated air density.

As described above, in the first embodiment, the outdoor unit 2 includes the outside air temperature detection unit 30 and the air pressure sensor 29, and the outdoor unit control unit 24 calculates an air property value in the environment where the air conditioner 1, more specifically, the outdoor unit 2 is installed, by using the outside air temperature detected by the outside air temperature detection unit 30 and the air pressure detected by the air pressure sensor 29. Then, the outdoor unit control unit 24 calculates a corrected rotational speed by correcting the control target value of the rotational speed of the outdoor unit fan 25 that is received from the indoor unit control unit 44 by using the calculated air property value, and controls the outdoor unit fan 25 using the corrected rotational speed. As a result, it is possible to achieve a necessary heat exchange amount in consideration of the coefficient of heat transfer between the air and the outdoor unit heat exchanger 26 of the outdoor unit 2 at the air pressure and the outside air temperature in the installation environment. That is, it is possible to achieve a heat exchange amount necessary between the outdoor unit heat exchanger 26 of the outdoor unit 2 and the air without being affected by the air property value of the installation environment of the outdoor unit 2, so that the air conditioner 1 can produce its ability.

Second Embodiment

In the first embodiment, the air pressure sensor 29 serves as an air pressure acquisition unit, and detects the air pressure so as to calculate an air property value of the installation environment of the outdoor unit 2. Meanwhile, a constituent element other than the air pressure sensor 29 may serve as the air pressure acquisition unit. In a second embodiment, a description will be given for an example where an air pressure acquisition unit indirectly acquires an air pressure by using location information indicating a location where the outdoor unit 2 is installed.

Figure 3:
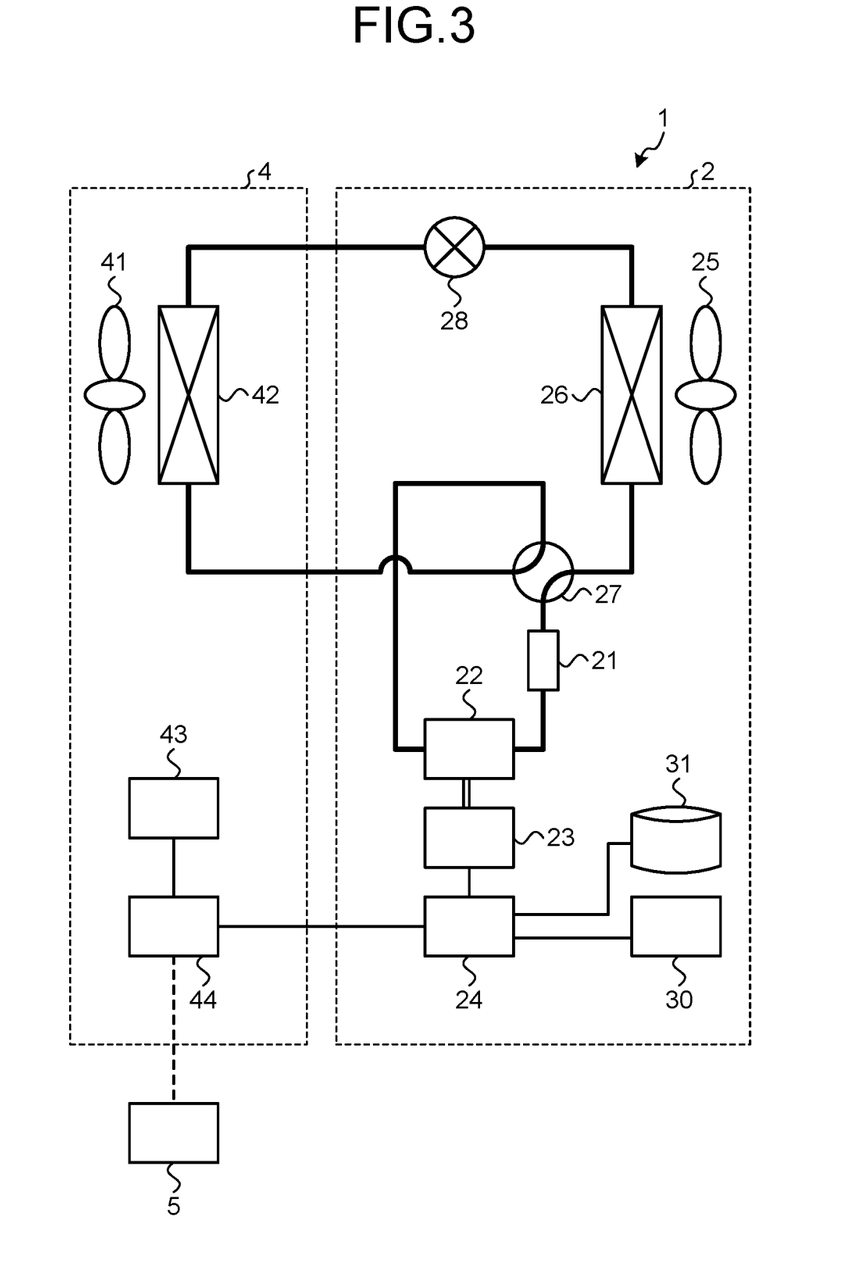
FIG. 3 is a diagram showing an example of a configuration of an air conditioner according to a second embodiment.

FIG. 3 is a diagram showing an example of a configuration of an air conditioner according to the second embodiment. Note that the same constituent elements as those in the first embodiment are denoted by the same reference numerals, and description thereof will be omitted. The remote 5 receives a user's setting of geographical location information on the air conditioner 1, more specifically, the outdoor unit 2, and transmits the setting to the outdoor unit control unit 24 via the indoor unit control unit 44. This specification is based on the assumption that the geographical location information is location information that does not include information regarding altitudes. When the air conditioner 1 is provided in Japan, examples of the geographical location information include a combination of a prefecture and a municipality, a detailed address, a zip code, and a combination of a latitude and a longitude.

The outdoor unit 2 includes a location information storage unit 31 that stores location information on the installation location of the outdoor unit 2, instead of the air pressure sensor 29 in FIG. 1. The location information may be any information as long as the information enables calculation of an air pressure at the installation location of the outdoor unit 2. The following is based on the assumption that the location information represents an altitude of the installation location of the outdoor unit 2. Note that although FIG. 3 illustrates an example that the location information storage unit 31 is provided in the outdoor unit 2, the location information storage unit 31 does not need to be provided in the outdoor unit 2, and may be provided in the indoor unit 4. In this case, the location information on the outdoor unit 2 is transmitted from the indoor unit control unit 44 to the outdoor unit control unit 24 via the communication unit (not illustrated).

The outdoor unit control unit 24 converts the geographical location information set from the remote 5 into an altitude with reference to altitude conversion information in which geographical location information and altitudes are associated with each other, and stores the converted altitude as location information in the location information storage unit 31. In addition, the outdoor unit control unit 24 converts the location information stored in the location information storage unit 31 into an air pressure. The altitude, the outside air temperature, and the air pressure are expressed by a predetermined relational equation. Therefore, when the location information represents an altitude, an air pressure can be obtained by use of this relational equation. Then, the outdoor unit control unit 24 calculates an air property value by using the air pressure, and corrects the rotational speed of the outdoor unit fan 25 received from the indoor unit control unit 44 by using a value obtained from the calculated air property value.

Next, a location information registration process and a process of acquiring an air pressure from location information, to be performed in the outdoor unit control unit 24 will be described in this order.

<Location Information Registration Process>

Figure 4:
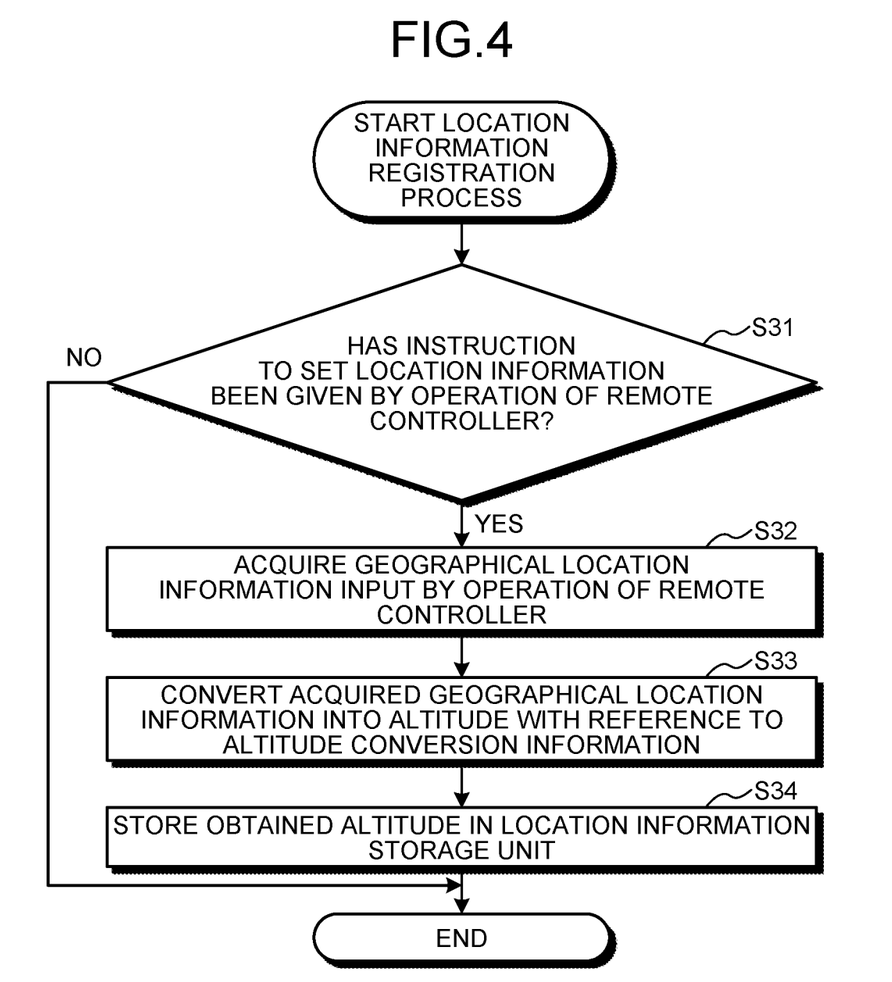
FIG. 4 is a flowchart showing an example of a procedure of a location information registration process to be performed in the air conditioner according to the second embodiment.

FIG. 4 is a flowchart showing an example of a procedure of the location information registration process to be performed in the air conditioner according to the second embodiment. First, the outdoor unit control unit 24 determines whether an instruction to set location information has been given by operation of the remote 5 (step S31). When no instruction to set location information has been given (No in step S31), the location information registration process ends.

When an instruction to set location information has been given (Yes in step S31), the outdoor unit control unit 24 acquires geographical location information input by operation of the remote 5 (step S32). As described above, when the air conditioner 1 is provided in Japan, examples of the geographical location information include a prefecture and a municipality, a detailed address, a latitude and a longitude, and a zip code. The user transmits the geographical location information input by operation of the remote 5, to the outdoor unit control unit 24 via the indoor unit control unit 44. That is, the outdoor unit control unit 24 acquires, via the indoor unit control unit 44, geographical location information on a geographical location where the air conditioner 1 is installed.

Figure 5:
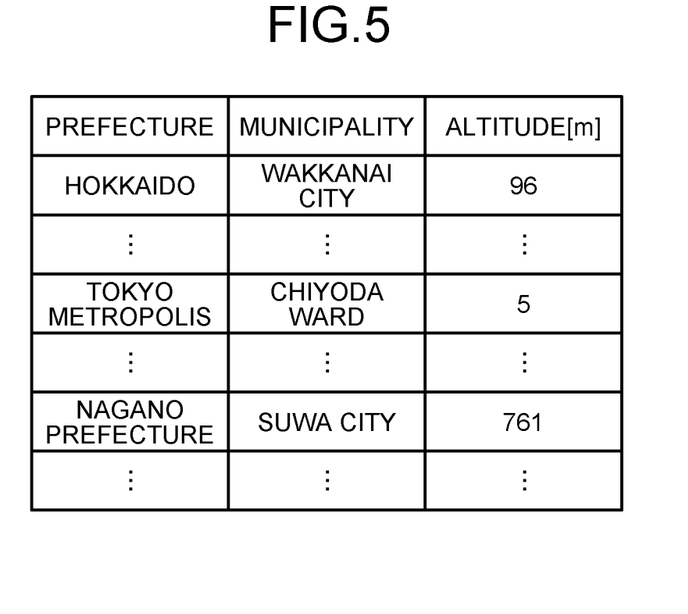
FIG. 5 is a diagram showing an example of altitude conversion information to be held by the air conditioner according to the second embodiment.

Next, the outdoor unit control unit 24 converts the acquired geographical location information into an altitude with reference to the altitude conversion information (step S33). FIG. 5 is a diagram showing an example of the altitude conversion information held by the air conditioner according to the second embodiment. In the altitude conversion information, a geographical location where the air conditioner 1 is provided is associated with an altitude. In FIG. 5, locations indicated by prefectures and municipalities in Japan are associated with altitudes of the locations. Note that, when the geographical location information represents a detailed address, the detailed address is associated with an altitude, and when the geographical location information represents a latitude and a longitude, the latitude and the longitude are associated with an altitude. Furthermore, when the geographical location information represents a zip code, the zip code is associated with an altitude. Note that, for example, when the outdoor unit 2 is installed on a roof of a building, the user may directly input the altitude of the installation location of the outdoor unit 2.

Returning to FIG. 4, the outdoor unit control unit 24 stores the obtained altitude in the location information storage unit 31 (step S34), and the location information registration process ends.

<Process of Acquiring Air Pressure from Location Information>

Figure 6:
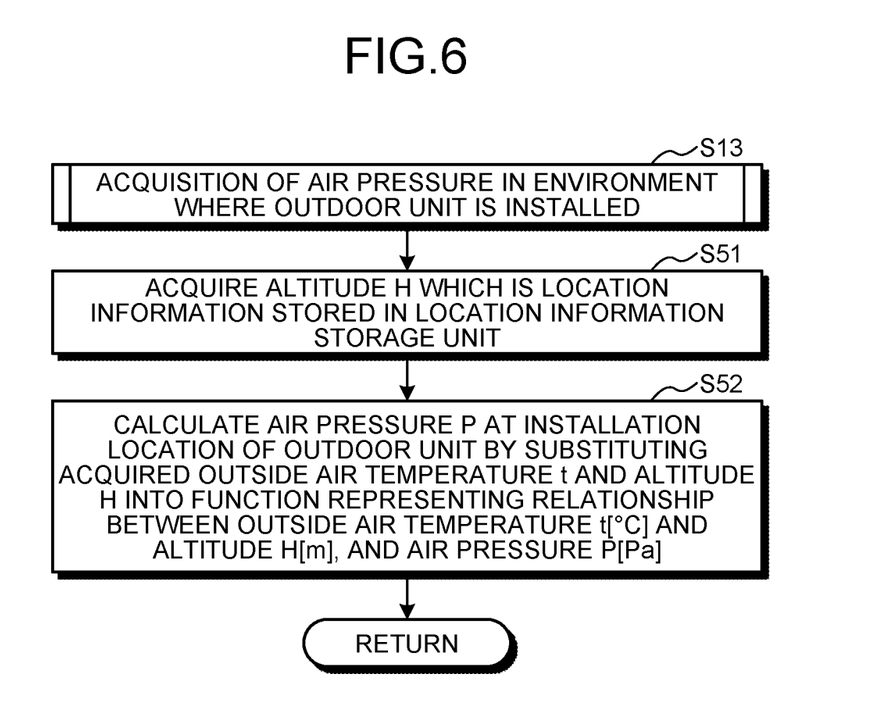
FIG. 6 is a flowchart showing an example of a procedure of a process of acquiring an air pressure in the air conditioner according to the second embodiment.

Next, a process of acquiring an air pressure from location information will be described. FIG. 6 is a flowchart showing an example of a procedure of the process of acquiring an air pressure in the air conditioner according to the second embodiment. Note that the process of acquiring an air pressure corresponds to step S13 in FIG. 2, that is, the process of acquiring an air pressure in the environment where the outdoor unit 2 is installed.

The outdoor unit control unit 24 acquires an altitude H which is location information stored in the location information storage unit 31 (step S51). Next, the outdoor unit control unit 24 calculates the air pressure P at the installation location of the outdoor unit 2 by substituting the acquired outside air temperature t and altitude H into a function representing the relationship between the outside air temperature t[° C.] and the altitude H[m], and the air pressure P[Pa] (step S52). In one example, the air pressure P[Pa] at the installation location of the outdoor unit 2 is calculated using equation (5) below.

Formula 2

$$P = P_0 \times \left(1 - \frac{0.00065H}{t + 0.0065H + 273.15}\right)^{5.257} \quad (5)$$

In equation (5), $P_0$ is a sea-level pressure. As a result of setting the sea-level pressure $P_0$ to an atmospheric pressure of 101,325 Pa, it is possible to obtain the air pressure P at the installation location of the outdoor unit 2 in consideration of the altitude, by acquiring only the altitude H and the outside air temperature t. Thereafter, the process returns to FIG. 2.

In addition, after the air pressure P is calculated by equation (5), the outdoor unit control unit 24 corrects the rotational speed of the outdoor unit fan 25 by executing processing of step S14 and the subsequent steps in FIG. 2 of the first embodiment.

As described above, the air conditioner 1 of the second embodiment calculates the air pressure at the installation location of the outdoor unit 2 by using the location information obtained by conversion of geographical location information set by the user into an altitude. The geographical location information is information on a geographical location where the outdoor unit 2 is installed. Then, the rotational speed of the outdoor unit fan 25 is corrected by use of the calculated air pressure. As a result, it is possible to calculate an air property value such as air density without providing the air pressure sensor 29, so that it is possible to implement the air conditioner 1 that is less expensive than the air conditioner 1 of the first embodiment.

Note that, in the second embodiment, location information represents an altitude, and the outdoor unit control unit 24 converts geographical location information into an altitude by using the altitude conversion information in FIG. 5. Meanwhile, the outdoor unit control unit 24 may directly convert geographical location information into an air pressure at the installation location of the outdoor unit 2. In this case, the outdoor unit control unit 24 converts geographical location information into an air pressure with reference to air pressure conversion information including geographical location information and air pressures associated with each other, instead of the altitude conversion information as exemplified in FIG. 5, and stores the air pressure as location information in the location information storage unit 31. The air pressure in the air pressure conversion information is obtained by equation (5) where, for example, t=25° C. Then, the outdoor unit control unit 24 just needs to hold the air pressure conversion information instead of the altitude conversion information. As a result, the process of calculating an air pressure from an altitude can be omitted.

Third Embodiment

In the second embodiment, calculation of an air property value at the installation location of the outdoor unit 2 is implemented without providing the air pressure sensor 29. Also in a third embodiment, a description will be given of an air conditioning system including the air conditioner 1 that can calculate an air property value without the air pressure sensor 29 more accurately than in the second embodiment.

Figure 7:
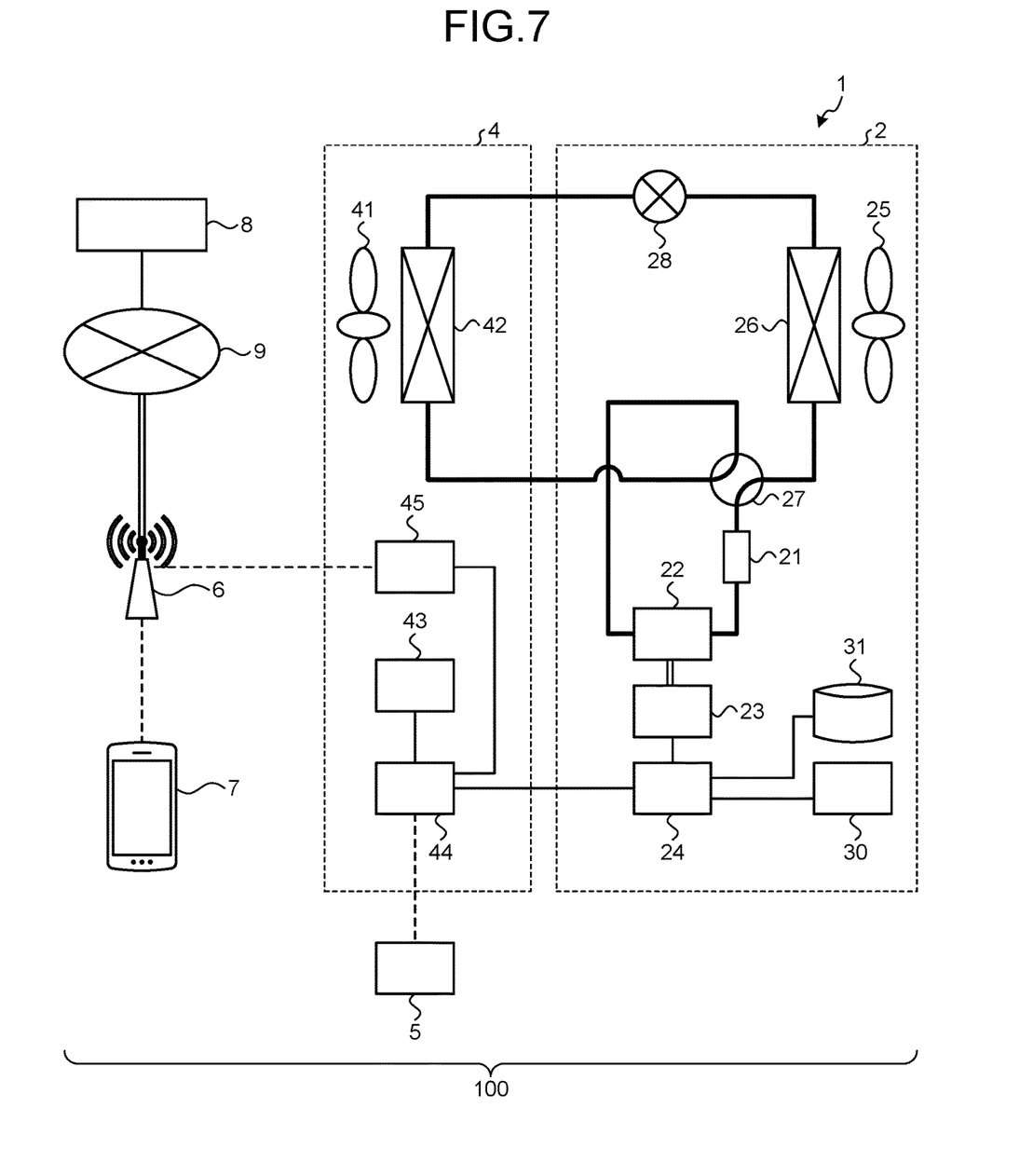
FIG. 7 is a diagram schematically showing an example of a configuration of an air conditioning system including an air conditioner according to a third embodiment.

FIG. 7 is a diagram schematically showing an example of a configuration of an air conditioning system including an air conditioner according to the third embodiment. Note that the same constituent elements as those described above are denoted by the same reference numerals, and description thereof will be omitted. Thus, difference from the description given above will be described. An air conditioning system 100 includes the air conditioner 1, an access point 6, an information communication terminal 7, and a server device 8.

The indoor unit 4 of the air conditioner 1 further includes a communication unit 45 that communicates with an external device. The communication unit 45 is wirelessly connected to the access point 6. Note that the indoor unit 4 includes the communication unit 45 in FIG. 7, but the outdoor unit 2 may include the communication unit.

The access point 6, the air conditioner 1, and the information communication terminal 7 configure a wireless local area network (LAN) as a wireless network, in which the access point 6 interconnects the wireless LAN and a network 9. That is, the air conditioner 1 and the information communication terminal 7 included in the wireless LAN are connected to the server device 8 via the network 9.

The information communication terminal 7 is an information processing device that is carried by a user of the air conditioner 1. The information communication terminal 7 has a wireless communication function that allows the user to acquire information on the air conditioner 1 and make settings for operation of the air conditioner 1. In the third embodiment, the information communication terminal 7 includes a location acquisition unit (not illustrated) that acquires location information representing a geographical location of the information communication terminal 7, and a communication unit (not illustrated) that is capable of wirelessly communicating with the access point 6. In one example, the location acquisition unit acquires the geographical location of the information communication terminal 7 by using a global positioning system (GPS). The communication unit transmits the location information acquired by the location acquisition unit to the air conditioner 1, via the wireless LAN or via the wireless LAN and the network 9. Examples of the information communication terminal 7 include a personal computer, a smartphone, and a tablet terminal. The user of the air conditioner 1 includes a person present in a room where the indoor unit 4 is installed or a worker who performs a process of installing the air conditioner 1.

The server device 8 collects information on the air conditioner 1, and performs monitoring and the like of the air conditioner 1. The server device 8 provides information on the air conditioner 1 to the user or the like of the air conditioner 1, or controls the air conditioner 1 in accordance with an instruction from the information communication terminal 7 of the user or the like of the air conditioner 1. The server device 8 may be a cloud server or an on-premises server. The server device 8 is an example of an external device.

The user of the air conditioner 1 operates the information communication terminal 7 at a location where the indoor unit 4 or the outdoor unit 2 of the air conditioner 1 is installed, acquires geographical location information on the information communication terminal 7, and transmits the geographical location information to the air conditioner 1 via the wireless LAN. When acquiring the geographical location information from the information communication terminal 7, the communication unit 45 of the air conditioner 1 passes the geographical location information to the outdoor unit control unit 24 via the indoor unit control unit 44. The outdoor unit control unit 24 calculates an air pressure at the installation location of the outdoor unit 2 by using the geographical location information on the information communication terminal 7 as geographical location information on the air conditioner 1, more specifically, geographical location information on the outdoor unit 2. In addition, as described in the first embodiment, the outdoor unit control unit 24 calculates an air property value by using the calculated air pressure, and corrects the rotational speed of the outdoor unit fan 25 received from the indoor unit control unit 44, by using a value obtained from the calculated air property value.

Next, a location information registration process to be performed in the information communication terminal 7 and a process of acquiring an air pressure from location information will be described in this order.

<Location Information Registration Process>

In the second embodiment, the user sets the geographical location information on the outdoor unit 2 by using the remote 5. Meanwhile, in the third embodiment, the user sets the geographical location information on the outdoor unit 2 via the information communication terminal 7. Note that the third embodiment assumes that the information communication terminal 7 carried by the user is present at the installation location of the air conditioner 1. At this time, the information communication terminal 7 treats geographical location information acquired by the GPS or the like, as geographical location information on the outdoor unit 2, and transmits the geographical location information to the outdoor unit control unit 24. The outdoor unit control unit 24 stores, as location information on the outdoor unit 2, the geographical location information on the outdoor unit 2 received via the communication unit 45 and the indoor unit control unit 44 and an altitude obtained from the geographical location information described in the second embodiment with reference to the altitude conversion information, in the location information storage unit 31.

<Process of Acquiring Air Pressure from Location Information>

Figure 8:
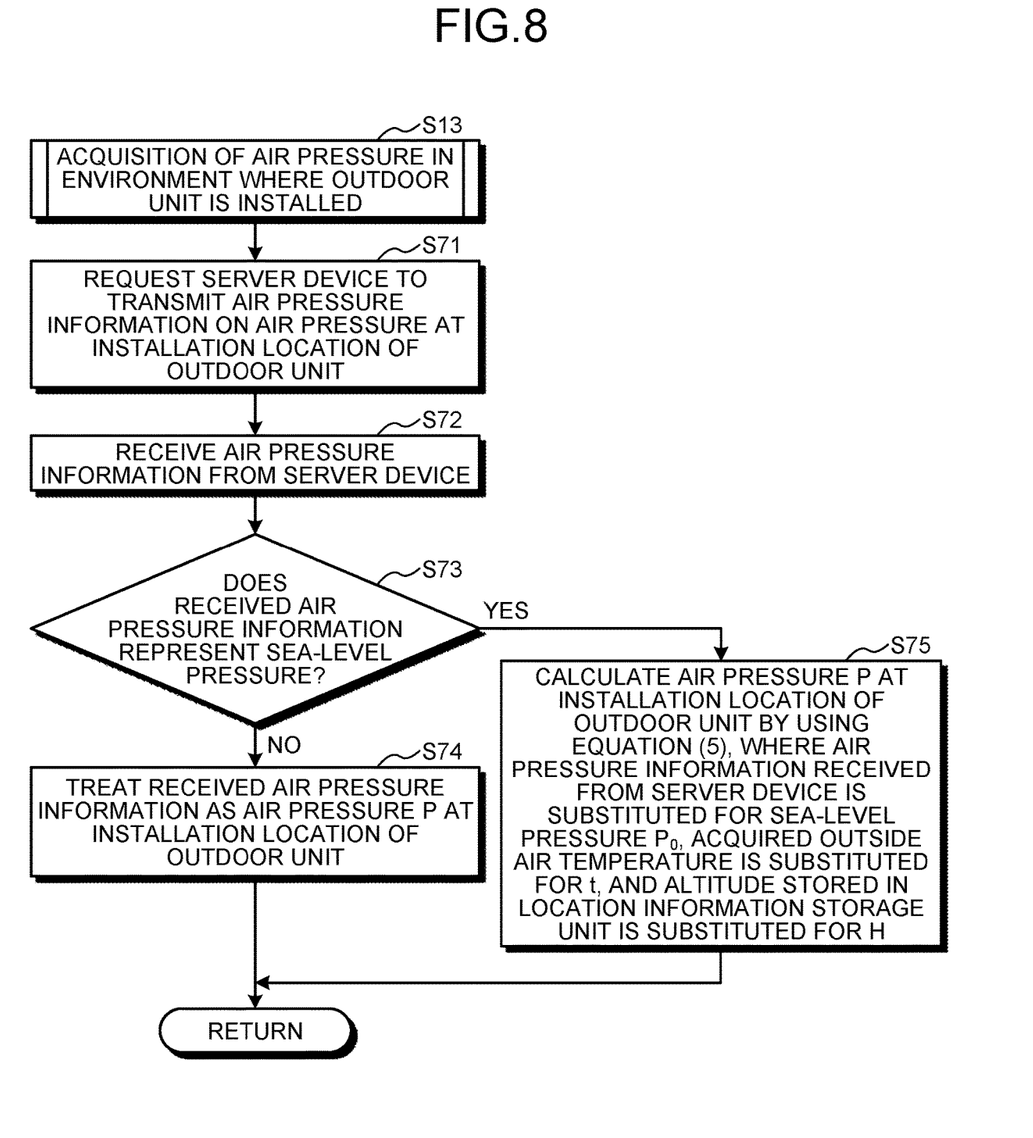
FIG. 8 is a flowchart showing an example of a procedure of a process of acquiring an air pressure in the air conditioner according to the third embodiment.

FIG. 8 is a flowchart showing an example of a procedure of the process of acquiring an air pressure in the air conditioner according to the third embodiment. Note that the process of acquiring an air pressure corresponds to the process of step S13 in FIG. 2. In one example, the process of acquiring an air pressure is started in response to a request from the outdoor unit control unit 24.

First, the outdoor unit control unit 24 requests, via the communication unit 45, the server device 8 to transmit air pressure information on an air pressure at the installation location of the outdoor unit 2 (step S71). At this time, the outdoor unit control unit 24 transmits location information stored in the location information storage unit 31 to the server device 8. The location information to be transmitted to the server device 8 includes the geographical location information on the outdoor unit 2.

When receiving, from the outdoor unit control unit 24, the request to transmit air pressure information, the server device 8 acquires air pressure information corresponding to the received location information based on the location information. The server device 8 acquires air pressure information from, for example, the Automated Meteorological Data Acquisition System closest to the received location information. The server device 8 transmits the acquired air pressure information to the outdoor unit control unit 24 of the air conditioner 1.

Thereafter, when receiving the air pressure information from the server device 8 (step S72), the outdoor unit control unit 24 determines whether the received air pressure information represents a sea-level pressure (step S73). The sea-level pressure is an air pressure in which an altitude is not taken into consideration. The Automated Meteorological Data Acquisition System predetermines, for each region, whether the air pressure indicates a sea-level pressure or an air pressure taken an altitude into consideration, and provides the air pressure information. In one example, it is possible to determine whether the air pressure information represents a sea-level pressure by using a region of the received air pressure information.

When the air pressure information does not represent a sea-level pressure (No in step S73), the outdoor unit control unit 24 treats the received air pressure information as the air pressure P at the installation location of the outdoor unit 2 (step S74). Meanwhile, when the air pressure information represents a sea-level pressure (Yes in step S73), the outdoor unit control unit 24 calculates the air pressure P at the installation location of the outdoor unit 2 by using equation (5), where the air pressure information received from the server device 8 is substituted for the sea-level pressure $P_0$, the acquired outside air temperature is substituted for t, and an altitude stored in the location information storage unit 31 is substituted for H (step S75). After steps S74 and S75, the process returns to FIG. 2. That is, as described in the first embodiment, an air property value is calculated by use of the air pressure, and the rotational speed of the outdoor unit fan 25 is corrected by use of the air property value.

Note that, when the air conditioner 1 is installed in a region where the air pressure information received from the Automated Meteorological Data Acquisition System takes the altitude into consideration, the location information does not need to include the altitude of the installation location of the outdoor unit 2. That is, the location information storage unit 31 just needs to store, as location information, the geographical location information acquired from the information communication terminal 7.

Furthermore, the outdoor unit control unit 24 acquires the air pressure information from the server device 8, and calculates an air density as one of air property values in the third embodiment, but this is an example. Alternatively, the server device 8 may calculate an air density, and transmit the air density to the outdoor unit control unit 24 via the network 9.

As described above, the air conditioner 1 of the third embodiment requests the server device 8 to transmit the air pressure information including the geographical location information acquired by the information communication terminal 7 carried by the user. The server device 8 acquires, from the Automated Meteorological Data Acquisition System, air pressure information on a location close to the acquired geographical location information, and transmits the acquired air pressure information to the outdoor unit control unit 24 of the air conditioner 1. The outdoor unit control unit 24 corrects the rotational speed of the outdoor unit fan 25 by using, as the air pressure, the air pressure information from the server device 8. Thus, not only a difference in air pressure due to a difference in altitude, but also a difference in air pressure due to weather conditions under which air pressure information has been acquired, is taken into consideration. As a result, the air density can be calculated with higher accuracy than in the second embodiment, and the control can be performed at a more desirable rotational speed of the outdoor unit fan 25.

Fourth Embodiment

In the first embodiment, the rotational speed of the outdoor unit fan 25 is corrected based on calculation of the air property value of the installation environment of the outdoor unit 2. However, it is conceivable that the air physical property value causes not a little influence on not only the outdoor unit fan 25 but also other actuators. Therefore, in a fourth embodiment, a mode will be described in which control is performed in consideration of air property values also for the actuators of the outdoor unit 2, other than the outdoor unit fan 25 and the indoor unit fan 41.

Since the configuration of the air conditioner 1 according to the fourth embodiment is similar to that illustrated in FIG. 1 of the first embodiment, description thereof will be omitted. However, the indoor unit control unit 44 has a function of recalculating an air property value based on which a control target value is calculated and used to cause the outdoor unit fan 25 to operate, and controlling the actuators and the indoor unit fan 41 based on the recalculated air property value.

Figure 9:
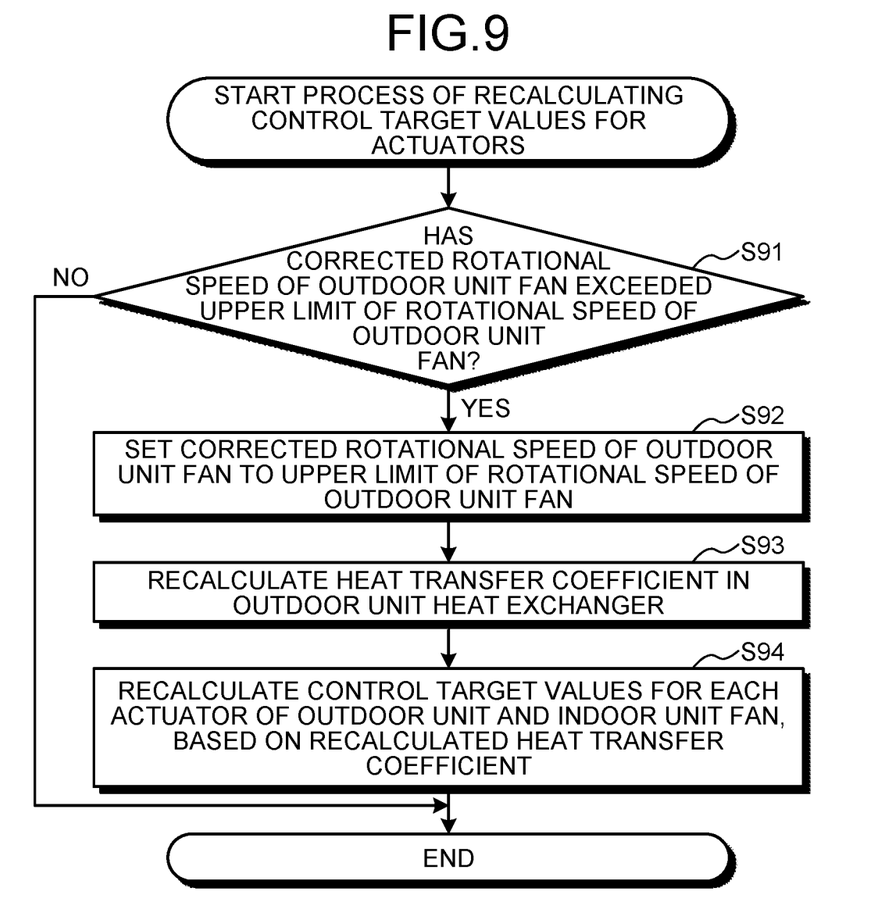
FIG. 9 is a flowchart showing an example of a procedure of a process of recalculating control target values for actuators in an air conditioner according to a fourth embodiment.

FIG. 9 is a flowchart showing an example of a procedure of a process of recalculating control target values for actuators in the air conditioner according to the fourth embodiment. This process is executed by the indoor unit control unit 44, and is started after completion of the process of calculation of the rotational speed of the outdoor unit fan 25 in FIG. 2.

First, the indoor unit control unit 44 checks whether a corrected rotational speed of the outdoor unit fan 25 that has been corrected by use of an air density has exceeded an upper limit of the rotational speed of the outdoor unit fan 25 (step S91). When the corrected rotational speed of the outdoor unit fan 25 has not exceeded the upper limit of the rotational speed of the outdoor unit fan 25 (No in step S91), control is continued by use of control target values for the actuators and the indoor unit fan 41 that have already been calculated, and thus the process of recalculating control target values is finished.

When the corrected rotational speed of the outdoor unit fan 25 has exceeded the upper limit of the rotational speed of the outdoor unit fan 25 (Yes in step S91), the indoor unit control unit 44 sets the corrected rotational speed of the outdoor unit fan 25 as the upper limit of the rotational speed of the outdoor unit fan 25 (step S92). Next, the indoor unit control unit 44 recalculates a heat transfer coefficient in the outdoor unit heat exchanger 26 (step S93). The indoor unit control unit 44 calculates a heat transfer coefficient h' by using the upper limit of the rotational speed of the outdoor unit fan 25 in accordance with the same processing as that in step S15 in FIG. 2. If the rotational speed of the outdoor unit fan 25 is limited, the heat transfer coefficient h' after the processing in step S92 is smaller than the heat transfer coefficient h before the processing in step S92.

Thereafter, the indoor unit control unit 44 recalculates control target values that are new command values for the indoor unit fan 41 and the actuators of the outdoor unit 2, based on the recalculated heat transfer coefficient (step S94). Specifically, the indoor unit control unit 44 calculates a heat exchange amount Q' by a known method from the heat transfer coefficient h' obtained in step S93. The indoor unit control unit 44 sets the calculated heat exchange amount Q' as a target heat exchange amount Q', and redetermines the rotational speed of the compressor 22, operation of the four-way valve 27, the opening degree of the decompressor 28, and the rotational speed of the indoor unit fan 41. Thus, the process of recalculating control target values is finished. Thereafter, as in the first embodiment, the indoor unit control unit 44 controls the indoor unit fan 41 by using the recalculated rotational speed of the indoor unit fan 41. Furthermore, the indoor unit control unit 44 transmits, to the outdoor unit control unit 24, command values for the rotational speed of the compressor 22, operation of the four-way valve 27, and the opening degree of the decompressor 28. The outdoor unit control unit 24 controls the actuators by using the recalculated command value.

Note that, here, an example according to the configuration of the first embodiment has been described, but the control target value for each actuator may be recalculated after the corrected rotational speed of the outdoor unit fan 25 can be determined also in the configurations of the second and third embodiments.

As described above, in the fourth embodiment, when the corrected rotational speed of the outdoor unit fan 25 exceeds the upper limit of the rotational speed of the outdoor unit fan 25 after the outdoor unit control unit 24 corrects the rotational speed of the outdoor unit fan 25, the outdoor unit control unit 24 sets the corrected rotational speed of the outdoor unit fan 25 to the upper limit of the rotational speed. The outdoor unit control unit 24 recalculates a heat transfer coefficient at the upper limit of the corrected rotational speed of the outdoor unit fan 25, and recalculates control target values for the indoor unit fan 41 and the actuators of the outdoor unit 2 by using the recalculated heat transfer coefficient. This enables more desirable operation of the outdoor unit fan 25, other actuators of the outdoor unit 2, and the indoor unit fan 41 in the installation environment of the air conditioner 1.

Figure 10:
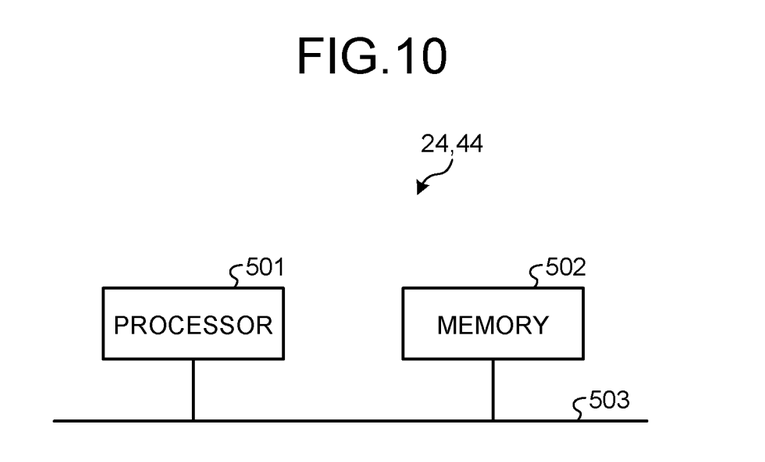
FIG. 10 is a block diagram schematically showing an example of a hardware configuration of each of an outdoor unit control unit and an indoor unit control unit to be included in each of the air conditioners according to the first to fourth embodiments.

The outdoor unit control unit 24 and the indoor unit control unit 44 of each of the first to fourth embodiments are implemented as processing circuitry. The processing circuitry may be dedicated hardware, or may be circuitry including a processor. FIG. 10 is a block diagram schematically showing an example of a hardware configuration of each of the outdoor unit control unit and the indoor unit control unit included in each of the air conditioners according to the first to fourth embodiments. The outdoor unit control unit 24 and the indoor unit control unit 44 each include a processor 501 and a memory 502. The processor 501 and the memory 502 are connected via a bus line 503. Each of the outdoor unit control unit 24 and the indoor unit control unit 44 is implemented by the corresponding processor 501 executing a program stored in the memory 502. In addition, a plurality of processors and a plurality of memories may cooperate to implement the above-described functions. Furthermore, some of the functions of the outdoor unit control unit 24 and the indoor unit control unit 44 may be implemented as electronic circuitry that is dedicated hardware, and other functions may be implemented by the respective processors 501 and memories 502. In one example, in the first to fourth embodiments, the indoor unit control unit 44 controls the rotational speed of the indoor unit fan 41 by electric signals, and the outdoor unit control unit 24 controls the rotational speed of the compressor 22, operation of the four-way valve 27, the opening degree of the decompressor 28, and the rotational speed of the outdoor unit fan 25 by electric signals.

The configurations set forth in the above embodiments show examples, and it is possible to combine the configurations with another known technique or combine the embodiments with each other, and is also possible to partially omit or change the configurations without departing from the scope of the present disclosure.

REFERENCE SIGNS LIST 1 air conditioner; 2 outdoor unit; 4 indoor unit; 5 remote controller; 6 access point; 7 information communication terminal; 8 server device; 9 network; 21 refrigerant storage unit; 22 compressor; 23 electric motor drive device; 24 outdoor unit control unit; 25 outdoor unit fan; 26 outdoor unit heat exchanger; 27 four-way valve; 28 decompressor; 29 air pressure sensor; 30 outside air temperature detection unit; 31 location information storage unit; 41 indoor unit fan; 42 indoor unit heat exchanger; 43 indoor temperature detection unit; 44 indoor unit control unit; 45 communication unit; 100 air conditioning system.

The invention claimed is:

1. An air conditioner comprising: an indoor unit; an outdoor unit; and processing circuitry to control operation of the indoor unit and the outdoor unit, wherein
the outdoor unit includes:
an outdoor unit fan to take in air;
an outdoor unit heat exchanger to cause outdoor air taken in by the outdoor unit fan and a refrigerant to exchange heat;
an outside air temperature detector to detect an outside air temperature that is a temperature of outside air; and
an air pressure sensor to acquire an air pressure of outside air, and
the processing circuitry calculates an air property value of air at an installation location of the air conditioner based on an outside air temperature acquired by the outside air temperature detector and an air pressure acquired by the air pressure sensor, calculates a heat transfer coefficient regarding heat transfer between the outdoor unit heat exchanger and the air from the air property value, calculates a corrected rotational speed that is a value obtained by correcting a rotational speed of the outdoor unit fan by using the heat transfer coefficient, and controls the outdoor unit fan using the corrected rotational speed.

2. An air conditioner comprising: an indoor unit; an outdoor unit; and a processing circuitry to control operation of the indoor unit and the outdoor unit, wherein
the outdoor unit includes:
an outdoor unit fan to take in air;
an outdoor unit heat exchanger to cause outdoor air taken in by the outdoor unit fan and a refrigerant to exchange heat; and
an outside air temperature detector to detect an outside air temperature that is a temperature of outside air; wherein
the processing circuitry stores air conditioner location information indicating a location where the air conditioner is installed, the air conditioner location information being convertible into an air pressure at the installation location of the air conditioner,
when geographical location information that is information on a geographical location where the air conditioner is installed is input to the processing circuitry, the processing circuitry converts the geographical location information into the air conditioner location information, stores the converted air conditioner location information, calculates an air pressure from the air conditioner location information, calculates an air property value of air at the installation location of the air conditioner from the calculated air pressure and an outside air temperature acquired from the outside air temperature detector, calculates a heat transfer coefficient regarding heat transfer between the outdoor unit heat exchanger and the air from the air property value, calculates a corrected rotational speed that is a value obtained by correcting a rotational speed of the outdoor unit fan by using the heat transfer coefficient, and controls the outdoor unit fan using the corrected rotational speed.

3. The air conditioner according to claim 2, wherein
the air conditioner location information indicates an altitude, and
the processing circuitry converts the input geographical location information into the air conditioner location information by using altitude conversion information in which the geographical location information is associated with the altitude.

4. The air conditioner according to claim 2, further comprising:
a remote controller to instruct the processing circuitry to make settings for operation of the air conditioner, wherein
the geographical location information is input via the remote controller.

5. The air conditioner according to claim 2, wherein
the processing circuitry communicates with an external device, wherein
the processing circuitry receives the geographical location information from an information communication terminal located at the installation location of the air conditioner, and
the processing circuitry converts, into the air conditioner location information, the geographical location information received.

6. The air conditioner according to claim 1, wherein
the outdoor unit further includes an actuator,
the indoor unit includes an indoor unit fan to take in air, and
the processing circuitry recalculates the heat transfer coefficient based on which a control target value is calculated and used to cause the outdoor unit fan to operate, and controls the actuator and the indoor unit fan based on the recalculated heat transfer coefficient.

7. The air conditioner according to claim 6, wherein the actuator includes: a compressor to compress a refrigerant that circulates between the indoor unit and the outdoor unit; a four-way valve to switch flow paths of the refrigerant; and a decompressor to decompress the refrigerant.

8. The air conditioner according to claim 3, further comprising:
a remote controller to instruct the processing circuitry to make settings for operation of the air conditioner, wherein
the geographical location information is input via the remote controller.

9. The air conditioner according to claim 2, wherein
the outdoor unit further includes an actuator,
the indoor unit includes an indoor unit fan to take in air, and the processing circuitry recalculates the heat transfer coefficient based on which a control target value is calculated and used to cause the outdoor unit fan to operate, and controls the actuator and the indoor unit fan based on the recalculated heat transfer coefficient.

10. The air conditioner according to claim 3, wherein
the outdoor unit further includes an actuator,
the indoor unit includes an indoor unit fan to take in air, and
the processing circuitry recalculates the heat transfer coefficient based on which a control target value is calculated and used to cause the outdoor unit fan to operate, and controls the actuator and the indoor unit fan based on the recalculated heat transfer coefficient.

11. The air conditioner according to claim 4, wherein
the outdoor unit further includes an actuator,
the indoor unit includes an indoor unit fan to take in air, and
the processing circuitry recalculates the heat transfer coefficient based on which a control target value is calculated and used to cause the outdoor unit fan to operate, and controls the actuator and the indoor unit fan based on the recalculated heat transfer coefficient.

12. The air conditioner according to claim 5, wherein
the outdoor unit further includes an actuator,
the indoor unit includes an indoor unit fan to take in air, and
the processing circuitry recalculates the heat transfer coefficient based on which a control target value is calculated and used to cause the outdoor unit fan to operate, and controls the actuator and the indoor unit fan based on the recalculated heat transfer coefficient.

13. The air conditioner according to claim 8, wherein
the outdoor unit further includes an actuator,
the indoor unit includes an indoor unit fan to take in air, and
the processing circuitry recalculates the heat transfer coefficient based on which a control target value is calculated and used to cause the outdoor unit fan to operate, and controls the actuator and the indoor unit fan based on the recalculated heat transfer coefficient.

14. The air conditioner according to claim 9, wherein the actuator includes: a compressor to compress a refrigerant that circulates between the indoor unit and the outdoor unit; a four-way valve to switch flow paths of the refrigerant; and a decompressor to decompress the refrigerant.

15. The air conditioner according to claim 10, wherein the actuator includes: a compressor to compress a refrigerant that circulates between the indoor unit and the outdoor unit; a four-way valve to switch flow paths of the refrigerant; and a decompressor to decompress the refrigerant.

16. The air conditioner according to claim 11, wherein the actuator includes: a compressor to compress a refrigerant that circulates between the indoor unit and the outdoor unit; a four-way valve to switch flow paths of the refrigerant; and a decompressor to decompress the refrigerant.

17. The air conditioner according to claim 12, wherein the actuator includes: a compressor to compress a refrigerant that circulates between the indoor unit and the outdoor unit; a four-way valve to switch flow paths of the refrigerant; and a decompressor to decompress the refrigerant.

18. The air conditioner according to claim 13, wherein the actuator includes: a compressor to compress a refrigerant that circulates between the indoor unit and the outdoor unit; a four-way valve to switch flow paths of the refrigerant; and a decompressor to decompress the refrigerant.

* * * * *